US008669311B2

(12) United States Patent
Colle et al.

(10) Patent No.: US 8,669,311 B2
(45) Date of Patent: *Mar. 11, 2014

(54) C7—C12 SECONDARY ALCOHOL ESTERS OF CYCLOHEXANOIC ACID

(75) Inventors: Karla S. Colle, Houston, TX (US); Jon E. R. Stanat, Westhampton Beach, NY (US); Juan J. Reinoso, Pittsford, NY (US); Allen D. Godwin, Seabrook, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 497 days.

This patent is subject to a terminal disclaimer.

(21) Appl. No.: 12/742,505

(22) PCT Filed: Oct. 23, 2008

(86) PCT No.: PCT/US2008/080891
§ 371 (c)(1),
(2), (4) Date: Aug. 16, 2010

(87) PCT Pub. No.: WO2009/070398
PCT Pub. Date: Jun. 4, 2009

(65) Prior Publication Data
US 2010/0305250 A1    Dec. 2, 2010

Related U.S. Application Data

(60) Provisional application No. 60/991,314, filed on Nov. 30, 2007.

(51) Int. Cl.
*C08K 5/10* (2006.01)
*C08K 5/12* (2006.01)
*C08L 27/06* (2006.01)

(52) U.S. Cl.
USPC .......... 524/284; 524/285; 524/306; 524/314; 524/569

(58) Field of Classification Search
USPC .................. 524/284, 285, 306, 314, 569
See application file for complete search history.

(56) References Cited

U.S. PATENT DOCUMENTS

| 2,070,770 | A | 2/1937 | Amend | |
|---|---|---|---|---|
| 2,311,259 | A | 2/1943 | Staff et al. | |
| 3,795,634 | A | 3/1974 | Nielsen | |
| 7,208,545 | B1* | 4/2007 | Brunner et al. | 524/569 |
| 7,297,738 | B2* | 11/2007 | Gosse et al. | 524/285 |
| 7,413,813 | B2* | 8/2008 | Gosse et al. | 428/518 |
| 7,585,571 | B2 | 9/2009 | Gosse et al. | |
| 7,855,340 | B2 | 12/2010 | Gosse et al. | |
| 8,084,534 | B2* | 12/2011 | Gosse et al. | 524/569 |
| 8,283,411 | B2 | 10/2012 | Gosse et al. | |
| 2005/0020718 | A1* | 1/2005 | Gosse et al. | 523/105 |
| 2006/0247461 | A1 | 11/2006 | Schlosberg et al. | |
| 2010/0310891 | A1 | 12/2010 | Godwin | |
| 2012/0071598 | A1 | 3/2012 | Gosse et al. | |

FOREIGN PATENT DOCUMENTS

| EP | 1 953 135 | 8/2008 | |
|---|---|---|---|
| WO | WO 99/32427 | 7/1999 | |
| WO | WO 0078704 A1 * | 12/2000 | C07C 69/75 |
| WO | WO 03/029339 | 4/2003 | |
| WO | WO 2004/046078 | 6/2004 | |
| WO | WO 2006/125670 | 11/2006 | |

OTHER PUBLICATIONS

Buttrey, D. N., Plasticizers, Leaver-Hume Press Ltd, London, 1950, pp. 16-27.
Mellan, I., Industrial Plasticizers, The Macmillan Company, New York, 1963, pp. 190-191.
Sears et al., "The Technology of Plasticizers," John Wiley & Sons, 1982, p. 349.
Hayden, J. W., Soc. Plastic. Eng., Annual Tech. Conference, Tech Papers, 28th (1970), pp. 46-47 (SPE Publisher, Greenwich, Conn.).

* cited by examiner

*Primary Examiner* — Michael Pepitone
(74) *Attorney, Agent, or Firm* — Leandro Arechederra, III

(57) ABSTRACT

C7-C12 secondary alcohol esters of cyclohexanecarboxylic acids are especially useful as plasticizers for PVC and other plasticizable polymers. In embodiments, these plasticizers are useful in plastisol formulations to help improved processability of flexible PVC material. In other embodiments these same plasticizers can be used in blends with other plasticizers to improve processability. In preferred embodiments these same plasticizers can be used to prepare flexible PVC compounds with enhanced low temperature flexibility, low toxicity, and improved resistance to outdoor aging.

2 Claims, No Drawings

C7—C12 SECONDARY ALCOHOL ESTERS OF CYCLOHEXANOIC ACID

CROSS-REFERENCE TO RELATED APPLICATIONS

This application is a 371 National Stage Application of International Application No. PCT/US2008/080891, filed Oct. 23, 2008, that claims the benefit of Provisional Application No. 60/991,314, filed Nov. 30, 2007, all of which are incorporated herein by reference in their entireties.

FIELD OF THE INVENTION

The invention relates to compositions based on cyclohexanoic acid esters of C7-C12 secondary alcohols.

BACKGROUND OF THE INVENTION

Plasticizers based on cyclohexane diesters were described in the patent literature at least as early as 1937, in U.S. Pat. No. 2,070,770. This class of plasticizers was described as being useful for nitrocellulose plasticization. The cyclohexane diester dibutyl hexahydrophthalate or alternatively called dibutyl cyclohexanediacid ester, sold under the brand name Hydropalate B and at one time available from Deutsche Hydrierwerke AG, is taught as a "gelatinizer for cellulose nitrate but not for cellulose acetate" in Plasticizers, by D. N. Buttrey, Leaver-Hume Press LTD, London, 1950, pp. 16-27.

U.S. Pat. No. 2,311,259 describes cyclohexanoates, including the cyclohexanol ester thereof. The problem with this product, a solid at room temperature, is that it is inefficient as a plasticizer (meaning it requires a large amount to provide a plasticizing effect), has poor low temperature flexibility, and is not a good viscosity depressant in plastisols.

Very little additional information appeared on these types of plasticizers until around 1960, following the commercialization by Union Carbide of their cyclohexane diester of 2-ethyl hexanol plasticizer Flexol™ 55-CC. This plasticizer was alternatively described as di-2-ethylhexyl hexahydrophthalate, and it was reported as being useful in flexible PVC plasticization. This material, otherwise known as di-2-ethylhexyl cyclohexanediacid ester, is described in Industrial Plasticizers by Ibert Mellan, The Macmillan Company, New York, 1963, pages 190-191. Specifically, the synthesis of Flexol CC-55 is set forth and described as a primary plasticizer for vinyl chloride resins, and said to compare favorably with dioctyl phthalate (DOP) in many basic properties. The PVC plasticized thereby it said to be processable by calendering, extruding, and molding, and as a plastisol. It is also described as compatible with a number of polymers, including polyvinyl acetate, polyvinyl butyral, polystyrene, and chlorinated and brominated rubber.

In the late 1990's and early 2000's, BASF, ExxonMobil, and others described compositions based on cyclohexanoate, cyclohexanedioates, and cyclohexanepolyoate esters, said to be useful for a range of goods from semi-rigid to highly flexible materials. See, for instance, WO 99/32427, WO 2004/046078, WO 2003/029339, WO 2004/046078, U.S. Application No. 2006-0247461, and U.S. Pat. No. 7,297,738.

Phthalate ester plasticizers based on secondary alcohols have also been known since the 1950's. Once such product was di-capryl phthalate, mentioned in D. N. Buttney's text, supra. The problem with this product, among others, is that it is based on capryl alcohol (C8 alcohol with substitution almost exclusively at the 2-position), which is a by-product of sebacic acid production, and hence its availability is limited. This plasticizer was used, for instance, in polyvinyl chloride foam products with silicone polymers. See U.S. Pat. No. 3,795,634. Dicapryl phthalate or DCP is particularly known as a plasticizer giving low, stable viscosities in plastisol formulations versus viscosities that can be obtained with other esters. See, for instance, The Technology of Plasticizers, J. Kern Sears and Joseph Darby, John Wiley & Sons, 1982 p. 349.

Work in the 1960-70's confirmed that secondary alcohol phthalate esters are good plasticizers provided that the hydroxyl group is positioned predominately at the 2-position. See J. W. Hayden, Soc. Plastic. Eng., Annual Tech. Conference., Tech Papers, 28th (1970), pages 46-47 (SPE Publisher, Greenwich, Conn.).

Despite all the above-mentioned work, an efficient plasticizer that can be easily and inexpensively manufactured is still being sought.

The present inventors have surprisingly discovered that secondary alcohol esters of cyclohexanecarboxylic acids based on C7-C12 secondary alcohols, such as cyclohexanemonocarboxylic acids, and cyclohexanedicarboxylic acids, are efficient as plasticizers in PVC and other polymer systems, offering improvements over other plasticizers.

SUMMARY OF THE INVENTION

The invention is directed to compositions based on C7-C12 secondary alcohol esters of cyclohexanecarboxylic acids, including cyclohexanemonocarboxylic acid esters and cyclohexanepolycarboxylic acid esters.

In embodiments, the compositions comprise at least one C7-C12 secondary alcohol esters of cyclohexanecarboxylic acids, and at least one plasticizable polymer, such as PVC, polyurethanes, acrylics, and polyolefins. Particularly preferred are PVC compositions with at least one C7-C12 secondary alcohol ester of a cyclohexanedicarboxylic acid.

In preferred embodiments, compositions according to the invention comprise at least one cyclohexanoate, cyclohexane dioate or cyclohexanoate trioate ester prepared from at least one C7 to C12 secondary alcohols and PVC.

In other preferred embodiments, the cyclohexanepolycarboxylic acid esters are preferably dicarboxylic acid esters based on the 1,2- or 1,4 cyclohexanedicarboxylic acid esters of C7-C12 secondary alcohols.

In still other preferred embodiments the C7-C12 secondary alcohol esters of cyclohexanecarboxylic acids are prepared using linear secondary alcohols derived from linear internal olefins and linear alpha olefins.

In still other preferred embodiments the C7-C12 secondary alcohol esters are prepared from branched secondary alcohols derived from lightly branched olefins In yet still other preferred embodiments, the plasticizers of this invention may be used in blends with other plasticizers, such as phthalate esters and/or benzoate esters and/or adipate esters and/or trimellitate esters and/or polymeric plasticizers and/or citrate plasticizers and/or terephthalate esters.

In other embodiments, these plasticizers are useful as viscosity depressants, particularly in plastisol formulations to help improved processability of flexible material such as PVC. In still other embodiments, the polymeric systems used with at least one C7-C12 secondary alcohol esters of cyclohexanecarboxylic acids may be selected from polyurethanes, acrylics, polyolefins, and other diverse polymers, as well as PVC.

It is an object of the invention to provide, in embodiments, compositions having at least one of improved low temperature flexibility, improved stability with respect to degradation caused by exposure to UV, heat, cold, and/or migration, and improved plastisol stability.

It is still another object of the invention to provide an improved plasticizing ester for plastisols, that gives lower plastisol viscosity and improved processability.

It is an object of the present invention to provide plasticized polymer compositions, such as PVC, polyurethanes, acrylics, and polyolefins compositions, including at least one plasticizer selected from secondary alcohol esters of cyclohexanecarboxylic acids.

It is another object of the invention to provide compositions comprising PVC and at least one plasticizer selected from secondary alcohol esters of cyclohexanecarboxylic acids, optionally including a second plasticizer not based on cyclohexanecarboxylic acid esters, such as phthalate or benzoate esters.

These and other objects, features, and advantages will become apparent as reference is made to the following detailed description, preferred embodiments, examples, and appended claims.

DETAILED DESCRIPTION OF THE INVENTION

According to the invention, polymer compositions comprising at least one ester selected from the group consisting of C7-C12 secondary alcohol esters of cyclohexanecarboxylic acid are provided. The polymers may be selected from any known plasticizable polymer, preferably PVC, polyurethanes, acrylics, and polyolefins. Preferred polyolefins include polypropylene, EDPM, and thermoplastic elastomers.

In preferred embodiments, the compositions comprise a plasticizing amount of said esters in PVC compositions. The term "plasticizing amount" means an amount sufficient for the purpose of processing the polymer into a final article (such as a toy) or intermediate article (such as a pellet or powder). One of skill in the art in possession of the present disclosure may determine the appropriate amount without more than routine experimentation. In embodiments, these esters provide improved PVC composition having improved low temperature flexibility and improved resistance to degradation cause by outdoor exposures.

The invention also concerns plastisol formulation comprising a plasticizable polymer, preferably PVC, and at least one C7-C12 secondary alcohol esters of cyclohexanecarboxylic acid. In embodiments, this provides for improved processability of PVC plastisol compositions.

Other terms used herein take their ordinary definition in the art unless otherwise defined, e.g, the term "secondary alcohol" means that the alcohol group is attached to a carbon that is itself attached to two other carbons. In embodiments the alcohols will include a mixture of isomers, e.g., wherein the alcohol group is at the second or third carbon atom, and the carbon chain may be linear or branched, with lightly branched C7-C12 secondary alcohols, i.e., having an average of 0.8 to 1.8 branches per chain, being preferred.

The term cyclohexanecarboxylic acid esters as used herein is intended to include the cyclohexane group having at least one carboxylic acid functional group attached directly to the C6 ring, thus including monocarboxylic acid and polycarboxylic acid groups, i.e., dicarboxylic acids, tricarboxylic acids, and so on. The preferred embodiment is the dicarboxylic acid ester of at least one C7-C12 secondary alcohols. All possible isomers of polycarboxylic acids are envisioned to be useful, however in preferred embodiments, the dicarboxylic acid isomer with the carboxylic acid groups in the 1,2-substitution position is the preferred isomer. Mixtures of isomers are also envisioned.

Note that the plasticizers of this invention can be described by several different names. For example the cyclohexanediacid ester of the C9 secondary alcohol with the substitution at the C2 position, can also be described as 1,2-Cyclohexanedicarboxylic acid, bis (1-methyloctyl) ester or 2-nonanol cyclohexanedioate, or Bis-(1-methyloctyl) cyclohexanedioate, or di(2-nonyl)cyclohexandioate, or di-sec-nonyl cyclohexanoate. These same esters can also be described as hexahydrophthalate esters, as for example Bis (1-methyloctyl) hexahydrophthalate or 1,2-hexahydrophthalic acid, bis (1-methyloctyl) ester. A C9 alcohol ester plasticizer of this invention with substitution at the C3 position would have similar names, including 1,2-cyclohexanedicarboxylic acid, bis(2-ethylheptyl) ester, or 3-nonanol cyclohexanedioate or Bis-(2-ethylheptyl) cyclohexandioate or di(3-nonyl) cyclohexandioate In preferred embodiments, these same cyclohexanedicarboxylic acid esters of C7 to C12 secondary alcohols plasticizers can be used in blends with other plasticizers, to improve the low temperature flexibility, the processability, and the outdoor aging resistance of PVC compositions based on other plasticizing esters such as di-isodecyl phthalate or di-isononyl cyclohexanedicarboxylic acid di-isononyl cyclohexanedicarboxylic acid ester, di-isodecyl cyclohexanedicarboxylic acid ester, di-2-propylheptyl cyclohexanedicarboxylic acid ester, diisononyl phthalate, di-2-propylheptyl phthalate, di-2-ethylhexyl terephthalate, tri-2-ethylhexyl trimellitate, triisononyl trimellitate and the like.

Examples of the C7-C12 secondary alcohol esters of cyclohexanecarboxylic acid include secondary alkyl esters of cyclohexane acid (or cyclohexanoic acid), 1,2 cyclohexanediacid (or hexahydrophthalic acid), cyclohexane anhydride (or hexahydrophthalic anhydride), 1,4 cyclohexanediacid (or hexahydroterephthalic acid), 1,3 cyclohexanediacid (or hexahydroisopthalic acid), 1,2,4 cyclohexanetriacid (or hexahydrotrimellitic anhydride), and other methyl substituted cyclohexanoic acids.

For the alkyl portion, the secondary alcohol can be 2-heptanol, 2-octanol, 2-nonanol. 2-decanol, 2-undecanol, 2-dodecanol, mixtures of 2- and 3-octanol, 2- and 3-nonanol, 2- and 3-decanol, 2- and 3-undecanol, and 2- and 3-dodecanol. In preferred embodiments, the ratio of 2- to 3-substituted alcohols is greater than 2/1. Other examples could include mixtures of the same 2- and 3-alcohols with alcohols substituted at the C4- and C5 and higher positions, and in preferred embodiments the ratio of C2+C3 alcohols to C3+C4+C5 alcohols is >4/1.

Although the examples cited above imply straight chain alcohols, this invention also applies to the corresponding branched products, as previously mentioned. Blends of branched and linear alcohols, such as mixtures of C8 and C9 secondary alcohols, each independently selected from branched and/or linear alcohols, or C9 and C10 secondary alcohols, each independently selected from branched and/or linear alcohols, or C10 and C11 secondary alcohols, each independently selected from branched and/or linear alcohols, or C11 and C12 secondary alcohols, each independently selected from branched and/or linear alcohols, or C8, C9, and C10 secondary alcohols, each independently selected from branched and/or linear alcohols, or C8, C10, and C12 secondary alcohols, each independently selected from branched and/or linear alcohols, or C7, C9, and C11 secondary alcohols, each independently selected from branched and/or linear alcohols, or C8, C9, C10 and C11 secondary alcohols, each independently selected from branched and/or linear alcohols, or C8, C9, C10, C11, and C12 secondary alcohols, each independently selected from branched and/or linear alcohols, or C10, C11, and C12 secondary alcohols, each independently selected from branched and/or linear alcohols, and so on, to encompass every possible mixture of C7-C12 secondary alcohols, each independently selected from branched and/or linear alcohols, are also useful to make these plasticizers, and in embodiments wherein the overall branching as measured by NMR techniques, is less than 1.8 branches per molecule, more preferably less than 1.5 branches per molecule, .and still more preferably less than 1.2 branches per molecule. In preferred embodiments, as previously mentioned, the lower limit on branching is 0.8 branches per chain, on average. The NMR technique used to measure branching is per se known in the art. See, for instance, WO 2006/012989.

These cyclohexanoate plasticizers can be prepared from either esterification of the cyclohexane acids, diacids, or anhydrides with C7-C12 secondary alcohols or they can be prepared from hydrogenation of secondary alcohol esters made from the corresponding aromatic acids or aromatic anhydrides such as benzoic acid, phthalic anhydride, terephthalic acid, or trimellitic anhydride. . The esters of this invention can also be prepared by the esterification of cyclohexane polyacids and/or anhydride. See also WO2004/046078. In embodiments, the esters according to the invention are prepared from the catalytic hydrogenation of the corresponding esters prepared from the same secondary alcohols and phthalic acid or anhydride, and/or terephthalatic acid and/or dimethyl terephthalate, wherein the acid moiety is hydrogenated after esterification with the secondary alcohol. The 1,2-Cyclohexane dicarboxylic acid anhydride or hexahydrophthalic anhydride, can be prepared through a direct route, such as the Diels Alder synthesis, using butadiene and maleic anhydride, followed by hydrogenation. In other embodiments, the esters according to the invention can be prepared by esterification of hexahydrophthalic anhydride and/or hexahydroterephthalic acid with C7-C12 secondary alcohols. In other embodiments, the ester according to the invention can be prepared by direct esterification of C4-C7 alkenes with 1,2 hexahydrophthalic acid.

Numerous esterification techniques are known in the art, e.g., such as disclosed in Volume 9 of the Kirk-Othmer Encyclopedia of Chemical Technology, Fourth Edition (1994), pp. 762-768. Preferred catalysts include titanium organometallic catalysts such as those per se well known in the art, e.g., U.S. Pat. No. 6,355,817 and U.S. Patent Application No. 20050038283.

The diester and triester plasticizers of this invention are particularly useful in plasticized PVC compositions and in PVC plastisols, either as the sole primary plasticizer or in blends with other plasticizers, such as phthalates, benzoates, polymeric plasticizers, and terephthalates. Here they would offer advantages improved low temperature flexibility, which means they can be used at cold temperatures without cracking under stress. They can be used to give increased product live in products designed for outdoor applications such as geomembranes, or tarpaulins, or roofing membranes or automotive parts. For PVC plastisols the esters of this invention give lower plastisol viscosity and improved processability versus those prepared plasticizers from C-1 substituted branched chain primary alcohols such as the di-isononyl cyclohexanediacid ester or the di-2-ethylhexyl cyclohexanediacid ester.

Products made using the plasticizers based on C7-C12 secondary alcohol esters of cyclohexanecarboxylic acid are particularly useful in outdoor applications, by providing improved UV stability when compared with other plasticizers, even those based on other cyclohexanoates such as di-isononyl cyclohexanoate or di-2-ethylhexyl cyclohexanoate.

Plasticized polymer compositions according to embodiments of the invention offer advantages in other areas, such as in toy manufacturing, where the low viscosity and fusion properties would be an advantage over most alternatives, automotive interior trim products because of their excellent UV stability, and wire insulation and jacketing compounds. These products are also particularly useful in the production of medical devices such as tubing, oxygen masks, blood bags, and IV bags and other delivery systems. These plasticizers would also be useful in the production of food films and in bottle cap liners.

The cyclohexane monoesters, such as the cyclohexane acid ester of a mixture of 2-nonanol and 3-nonanol or a mixture of 2-decanol and 3-decanol are useful to reduce plastisol viscosity and to reduce the PVC fusion temperatures. This is especially beneficial as a non-yellowing viscosity modifier in vinyl sheet flooring manufacturing. These cyclohexanoate esters would contribute to improve stain resistance. These same cyclohexane monoesters are also useful plasticizing process aids in the production of PVC toys through rotomolding and casting processes.

In embodiment, the C7-C12 secondary alcohol esters of cyclohexanecarboxylic acid plasticizers can be mixed with PVC, such as in concentrations ranging from 10 phr to 100 phr, and optionally used in combinations with other additives such as calcium carbonate fillers, Ca/Zn or Ba/Zn stabilizers, epoxidized soy bean oil, lubricants, pigments and dies or other colorants, antioxidants, and other stabilizers, as well as with other plasticizers, as previously mentioned. The PVC compositions of this invention can be processed into products through rotomolding, dipping, spreading, molding, extrusion, calendering, and injection molding.

The PVC compositions comprising at least one C7-C12 secondary alcohol esters of cyclohexanecarboxylic acid are especially useful in vinyl flooring, automotive interior trim, wire insulation, wire jacketing and insulation, medical devices, wall coverings, food films, bottle cap liners, roofing membranes, geomembranes, table cloths, clothes, shower curtains, shoe soles, carpet backing, toys, stationary and notebooks, and signs.

The diacid plasticizers of this invention are particularly useful, either as the sole primary plasticizer or in blends with other plasticizers, such as phthalates, benzoates, polyester polymeric plasticizers prepared, for instance, from the condensation of adipic acid with other polyols, alcohols, and acids, other cyclohexanediacid esters, and terephthalates. These esters and diesters are particularly useful in plastisol compositions. In embodiments, they offer advantages of lower plastisol viscosity versus those plasticizers prepared from 1-substituted branched chain (primary) alcohols such as di-isoheptyl phthalate, di-isononylcyclohexanoate, di-isononyl phthalate, or di-isodecyl phthalate and the like.

In products designed for outdoor applications, these secondary alcohol esters would be useful in offering improved UV stability over phthalates esters and di-isononyl cyclohexanoate. These products are also useful in toy manufacturing, where their low viscosity and fusion properties would be an advantage over most alternatives. Other examples include vinyl resilient flooring, vinyl backed carpeting, wall paper, automotive air filters, coated fabrics, dip molded products such as gloves, T-shirt inks, and foamed PVC products (e.g., floor mats).

In one embodiment of this invention, these C7-C12 secondary alcohol esters of cyclohexanecarboxylic acid plasticizers can be mixed with PVC suspension resin, in concentrations ranging from 5 phr to 100 phr, and can be used in combinations with other additives such as calcium carbonate fillers, Ca/Zn or Ba/Zn stabilizers, epoxidized soy bean oil, lubricants, pigments and dies or other colorants, antioxidants, other plasticizers and stabilizers. In this embodiment, the total plasticizer concentration will range from 25 parts 100 phr, preferably 35 to 80 phr. The PVC compositions of this embodiment can be processed into products through injection molding, extrusion, calendering, and rotomolding.

In another embodiment of this invention, plastisols can be prepared with these C7-C12 secondary alcohol esters of cyclohexanecarboxylic acid plasticizers, where in mixtures with PVC paste or emulsion resin, the concentrations of the plasticizers of this invention can range from 40 phr to 150 phr, and can be used with other additives such calcium carbonate fillers, Ca/Zn or Ba/Zn stabilizers, epoxidized soy bean oil, lubricants, pigments and dies or other colorants, antioxidants, PVC blending resins, viscosity or flow additives, diluents, other plasticizers and stabilizers. For plastisols, the total concentration of liquids including plastisizers, stabilizers, and viscosity control additives will range from 40 phr to 200 phr. Plasticisols can be processed into flexible PVC products through techniques such as rotomolding, dipping, spreading, spraying, casting, or cavity molding.

In yet still more embodiments, polymer compositions comprising secondary alcohol C7-C12 cyclohexanepolyoate esters are also useful in other applications such as solvents for printing inks, coalescent agents for film forming polymers (latex paints, floor polishes, adhesives, sealants), blank wash (printing), agricultural chemical solvents and emulsifiable concentrates, drilling fluids, lubricants, cosmetics, solvents for fuel and lube additives, emollients, and personal care applications. These uses, in particular, take advantage of the benefits offered by C7-C12 secondary alcohol esters of cyclohexanecarboxylic acid in areas other than polymer plasticizing and in uses other than with PVC. Thus, the C7-C12 secondary alcohol esters of cyclohexanecarboxylic acid are useful with diverse polymers, polyurethanes, acrylics, polypropylene, EDPM, elastomers, thermoplastic elasomers (TPE) and thermoplastic vulcanizates (TPV).

In embodiments, compositions of the invention, in addition to containing a polymer such as PVC and at least one C7-C12 secondary alcohol esters of cyclohexanecarboxylic acid, may also further comprise known plasticizers such as fast fusing plasticizers. Fast fusing or stronger solvating plasticizers are desired in many PVC processes, as they enable high quality flexible PVC products to be made efficiently. These fast fusing or strong solvating plasticizers are often used to improve the processability or to reduce the fusion or processing temperature of plasticized PVC formulations or plastisol compositions that are based on less solvating plasticizers as the primary plasticizer. Preferred fast fusing plasticizers include butyl benzyl phthalate (BBP), diisoheptyl phthalate, dihexyl phthalate, dibutyl phthalate, dibutyl terephthalate, dibenzoate esters of diethylene glycol or dipropylene glycol, benzoate esters of C8 or C9 or C10 branched primary alcohols, various alkyl sulfonic acid esters of phenol, and cyclohexanediacid esters of C4-C7 alcohols. Plasticizers other than C7-C12 secondary alcohol esters of cyclohexanecarboxylic acid may be used in amounts greater than or less than the total concentration of the C7-C12 secondary alcohol esters of cyclohexanecarboxylic acid. Blending the products of the present invention with fast fusing plasticizers offer advantages in processing, such as having faster processing speeds or lower oven/heating temperatures while maintaining the improved properties of enhanced low temperature flexibility and improved outdoor aging. Temperature can be a limitation in coating products such as paper or carpet fibers where a lower fusing temperature allows these materials to be used without experiencing thermal decomposition. Lower operating temperatures are also advantaged in having lower heating costs, for example in automotive underbody sealants and coatings. Faster fusing also yields advantages in processing speeds, such as coated fabrics, sheet flooring, glove dipping, underbody automotive sealants, and rotomolding.

The cyclohexanediacid esters of secondary alcohols of the invention offer the advantage of plastisol viscosity reduction. Reduction is plastisol viscosity is desired as it allows for coating processes to operate at faster line speeds; this is important to the production of vinyl sheet flooring, coated fabrics, and wall paper.

The cyclohexanediacid esters of secondary alcohols of the invention offer the advantage of improved viscosity stability. Often with some fast fusing plasticizers such as butyl benzoate, because this material is a strong solvent for PVC, plastisols prepared with BBP either as a primary plasticizer or as part of the plasticizer system, will slowly increase in viscosity. This viscosity increase can slow down production and can lead to product failures. Plasticizers of this invention, will have good viscosity stability.

The invention is applicable across the range of plasticized polyvinyl chloride materials. It is applicable to the production of semi-rigid polyvinyl chloride compositions, which preferably contain from about 10 to about 40 parts, more preferably 15 to 35 parts, still more preferably 20 to 30 parts of plasticizer per 100 parts of polyvinyl chloride. The invention is also applicable to flexible polyvinyl chloride compositions which preferably contain from about 40 to about 60 parts, more preferably 44 to 56 parts, still more preferably from 48 to 52 parts per 100 parts of polyvinyl chloride, and also to the highly flexible compositions, which preferably contain from about 70 to about 110 parts, more preferably 80 to 100 parts, still more preferably 90 to 100 parts of plasticizer per 100 parts of polyvinyl chloride. As used herein, parts are given on a weight basis.

The semi-rigid compositions are typically used for the production of pipes, some wire and cable coatings, floor tiles, window shades, films, blood bags and medical tubing. Flexible compositions are typically used for the production of sheeting, upholstery, medical tubing, garden hoses, pool liners, water beds and the like. Very flexible compositions are used in the production of coated cloth, toys, shoe soles and the like. The esters of cyclohexanepolycarboxylic acid according to the invention, i.e., wherein at least one of the alcohol groups is selected from at least one C7-C12 secondary alcohols, are particularly useful in the production of medical articles such as blood bags and medical tubing and in toys and materials used for food contact such as bottle caps and films where di-2-ethyhexyl phthalate has traditionally been used and there are some concerns about its toxicity.

In another aspect of the present invention, the at least one C7-C12 secondary alcohol ester of a cyclohexanemono- or poly-carboxylic acid are used together with other plasticizers. For example, at least one of the esters according to the invention may be used with plasticizers such as adipate esters, phthalate esters, trimellitate esters, benzoic acid esters, aliphatic acid esters, various polymeric plasticizers, and mixtures thereof. When used in plasticizer blends the relative proportions of the plasticizers that are used will depend upon the desired properties. However we prefer to use at least 5 wt %, more preferably at least 10 wt %, more preferably at least 15 wt %, more preferably at least 20 wt %, more preferably at least 25 wt %, more preferably at least 30 wt %, more preferably at least 35 wt %, more preferably at least 40 wt %, more preferably at least 45 wt %, more preferably at least 50 wt %, more preferably at least 55 wt %, more preferably at least 60 wt %, more preferably at least 65 wt %, more preferably at least 70 wt %, more preferably at least 75 wt %, more preferably at least 80 wt %, more preferably at least 85 wt %, more preferably at least 90 wt %, of the at least one C5-C7 secondary alcohol ester of the cyclohexanemono- and/or poly-carboxylic acids, based on the total weight of plasticizer present. In a preferred embodiment wherein a mixture of plasticizers is used and one of the plasticizers is a phthalate, the mixture preferably comprises no more than 95 wt % cyclohexane polycarboxylic acid according to the invention. Preferred ranges include between 0.01 and 95 wt %, more preferably 5 to 90 wt %, more preferably 10 to 80 wt %, more preferably 20 to 70 wt %, more preferably 30 to 60 wt % of the at least one C5-C7 secondary alcohol ester of cyclohexanecarboxylic acids, preferably of cyclohexanepolycarboxylic acids, still more preferably cyclohexanedicarboxylic acid.

We have also found that cyclohexanecarboxylic acid esters of the invention, i.e., the C7-C12 secondary alcohol esters thereof, particularly C7-C12 secondary alcohol esters of cyclohexanepolycarboxylic acids, impart an improved stability to ultra-violet light when used as plasticizers in polyvinyl chloride compositions. This improved stability leads to longer service life for materials made from the polyvinyl chloride especially in an environment where they are subjected to sunlight. Throughout this application ultra-violet light stability is measured in the QUV test which is ASTM G 53-84. This is particularly useful where the plasticized polyvinyl chloride composition is to be used in outdoor applications. In particular, this is useful in applications such as roofing, tarpaulins and tents, films such as adhesive tapes and agricultural films, shoes and automobile interiors.

In a further embodiment the present invention therefore provides a plasticized polyvinyl chloride composition preferably containing from about 20 to about 100 parts by weight, more preferably 30 to 90 parts by weight, still more preferably 40 to 80 parts by weight, yet still more preferably 50 to 70 parts by weight of a plasticizer composition containing one or more cyclohexane carboxylic acid esters of the invention, i.e., the at least one C5-C7 secondary alcohol esters of cyclohexane mono- or polycarboxylic acids, as plasticizer per 100 parts of polyvinyl chloride said composition having a stability to ultra-violet light indicated by the low development of colour in the QUV test over 456 hours in a formulation containing 100 parts of solvic 367 polyvinyl chloride, 50 parts of plasticizer according to the invention, 5 parts of Durcal calcium carbonate filler and 2 parts of LZB 320 stabilizer.

In a further embodiment the present invention provides the use of a plasticized polyvinyl chloride composition preferably containing from about 20 to about 100 parts by weight, more preferably 30 to 90 parts by weight, still more preferably 40 to 80 parts by weight, yet still more preferably 50 to 70 parts by weight of a plasticizer composition containing one or more C7-C12 secondary alcohol esters of a cyclohexanemono- and/or poly-carboxylic acids according to the invention as plasticizer, per 100 parts by weight of polyvinyl chloride, in the production of articles, said composition having a stability to ultra-violet light, as indicated by the low development of color in the QUV test over 456 hours in a formulation containing 100 parts of solvic 367 polyvinyl chloride, 50 parts of plasticizer according to the invention, 5 parts of Durcal calcium carbonate filler and 2 parts of LZB 320 stabilizer.

In a further embodiment, the invention provides roofing, tarpaulins, tents, films, sheeting, floor covering, shoes and automobile interior fabrics and molded products obtained from a plasticized polyvinyl chloride composition, preferably containing from about 20 to about 100 parts by weight, more preferably 30 to 90 parts by weight, still more preferably 35 to 70 parts by weight, yet still more preferably 40 to 60 parts by weight, of a plasticizer composition containing one or more cyclohexanemono- and/or poly-carboxylic acid esters according to the invention, i.e., at least one C7-C12 secondary alcohol ester of a cyclohexanecarboxylic acid, per 100 parts of polyvinyl chloride.

One widespread use of polyvinyl chloride is as a plastisol. A plastisol is a fluid or a paste consisting of a mixture of polyvinyl chloride and a plasticizer optionally containing various additives. A plastisol is used to produce layers of polyvinyl chloride which are then fused to produce coherent articles of flexible polyvinyl chloride. Plastisols are useful in the production of flooring, tents, tarpaulins, coated fabrics such as automobile upholstery, in car underbody coatings, in moldings and other consumer products. Plastisols are also used in medical uses such as blood bags and tubing, footwear, fabric coating, toys, flooring products and wallpaper. Plastisols typically contain about 40 to about 200 parts by weight, more typically 50 to 150 parts by weight, more typically 70 to 120 parts by weight, more typically 90 to 110 parts by weight of plasticizer per 100 parts of polyvinyl chloride.

Plastisols are usually made from polyvinyl chloride that has been produced by emulsion polymerization or micro suspension polymerization. The plastisol may be produced by the manufacturer of the polyvinyl chloride or a compounder and shipped to the user in fluid form. Alternatively the plastisol may be produced by the user. In either instance, although particularly when the plastisol is produced by the manufacture of the polyvinyl chloride or a compounder, it is important that the plastisol viscosity be stable over time.

Phthalate esters are widely used as plasticizers in plastisols. However, plastisols based on phthalate ester plasticizers suffer from the disadvantages that the viscosity of the plastisol can be undesirably high and that the viscosity of the plastisol can increase to an undesirable extent over time. We have found that when the cyclohexanemono- and/or poly-carboxylic acid esters according to the invention are used as the primary plasticizer, the plastisols have improved viscosity stability over time, furthermore they also have improved viscosity. This is particularly useful where the plastisol is to be stored for sometime between production and use, for example when it is used in coating applications.

The present invention therefore provides a plastisol composition containing at least one C7-C12 secondary alcohol ester of cyclohexane mono- and/or polycarboxylic acid, preferably in the amount of from about 40 to about 200 parts by weight, more preferably 50 to 150 parts by weight, still more preferably 70 to 120 parts by weight, yet still more preferably 90 to 110 parts by weight of plasticizer per 100 parts of polyvinyl chloride, wherein the plasticizer comprises one or more C5-C7 secondary alcohol ester of a cyclohexane polycarboxylic acid ester.

In a further embodiment, the present invention provides a process for the production of flexible polyvinyl chloride comprising forming a layer from a plastisol containing from 40 to 200 parts by weight preferably 50 to 150 parts by weight, more preferably 70 to 120 parts by weight, more preferably 90 to 110 parts by weight of a plasticizer composition containing one or more C7-C12 secondary alcohol ester of a cyclohexanepolycarboxylic acid esters per 100 parts by weight of polyvinyl chloride and subsequently fusing the layer by the application of heat.

The use of the at least one C7-C12 secondary alcohol ester of a cyclohexanepolycarboxylic acid as a plasticizer for polyvinyl chloride compositions also provides improved cold flex properties. Cold flex leads to an improved service temperature range and is particularly useful in the production of articles used in a wide range of temperatures. Throughout this application the cold flex properties are measured using the Clash and Berg test (ASTM D 1043-84) and the ASTM D 746 brittleness test. The improved cold flex is particularly useful when the plasticized polyvinyl chloride composition is to be used in articles which are used over a wide temperature range. In particular this is useful in applications such as roofing, tarpaulins and tents, protective films including food wrap films, wire and cable, coated fabrics, shoes and medical applications such as blood bags and tubing.

The present invention therefore provides a plasticized polyvinyl chloride composition containing from 20 to 100 parts by weight preferably 30 to 90 parts by weight, more preferably 40 to 80 parts by weight, more preferably 50 to 70 parts by weight of a plasticizer composition containing one or more C7-C12 secondary alcohol esters of a cyclohexanepolycarboxylic acid ester per 100 parts of polyvinyl chloride having a cold flex below −20° C. as measured by the Clash and Berg test on a formulation of 100 parts of Solvic 271 GC polyvinyl chloride, 150 parts of plasticizer, 80 parts of calcium carbonate filler EXH ISP from Omya, 6 parts of Tribasic lead stearate and 1 part of dibasic lead stearate.

Cyclohexane polycarboxylic acid esters of C7-C12 secondary alcohols can be used in combination with numerous plasticizers in order to improve the properties of flexible PVC compositions. These improvements include low temperature flexibility and improved resistance to outdoor aging. Examples of suitable benzenepolycarboxylic acids or a derivatives thereof with which the esters of the cyclohexane carboxylic acids may be used are the alkyl terephthalates such as, di-n-butyl terephthalate, disecbutyl terephthalate, di-n-octyl terephtalate, diisooctyl terephthalate, di-2-ethylhexyl terephthalate, di-n-nonyl terephthalate, diisononyl terephthalate, di-n-decyl terephthalate, di-2-propylheptyl terephthalate, di-n-undecyl terephthalate, diisodecyl terephthalate, diisododecyl terephthalate, and dicyclohexyl terephthalate.

Another suitable class are the alkyl phthalates such as di-n-butyl phthalate, diisobutyl phthalate, di-n-octyl phthalate, diisooctyl phthalate, di-2-ethylhexyl phthalate, di-n-nonyl phthalate, diisononyl phthalate, di-n-decyl phthalate, diisodecyl phthalate, di-n-undecyl phthalate, diisododecyl phthalate, di-2-propylheptyl phthalate, dicyclohexyl phthalate; alkyl isophthalates such as di-n-butyl isophthalate, diisobutyl isophthalate, di-n-octyl isophthalate, diisooctyl isophthalate, di-2-ethylhexyl isophthalate, di-n-nonyl isophthalate, diisononyl isophthalate, di-n-decyl isophthalate, diisodecyl isophthalate, di-n-undecyl isophthalate, diisododecyl isophthalate, and or dicyclohexyl isophthalate.

Further examples of commercially benzenepolycarboxylic acid esters with which the esters of the cyclohexane carboxylic acids may be used include phthalates such as: Palatinol® AH (Di-(2-ethylhexyl) phthalate; Palatinol® AH L (Di-(2-ethylhexyl) phthalate); Palatinol® C (Dibutyl phthalate); Palatinol® IC (Diisobutyl phthalate); Palatinol® N (Diisononyl phthalate); Palatinol® Z (Diisodecyl phthalate), Vestinol (™) 9, Palatinol® 10-P (Di-(2-Propylheptyl)phthalate); Palatinol® 711P (Heptylundecyl phthalate); Palatinol® 911 (Nonylundecyl phthalate); Palatinol® 11P-E (Diundecyl phthalate); Palatinol® M (Dimethyl phthalate); Palatinol® A (Diethyl phthalate); Palatinol® A (R) (Diethyl phthalate); and Palatinol® K (Dibutylglycol phthalate). Further examples are the commercially available adipates such as: Plastomoll® DOA (Di-(2-ethylhexyl) adipate), Hexamoll (™) DINCH and Plastomoll® DNA (Diisononyl adipate).

In one embodiment the invention therefore provides a plastisol of low viscosity which can be used to produce finished articles with low emissions of volatile organic compounds. The composition also provides additional unexpected benefits during processing and to the properties of articles fabricated from the composition. The performance of the ester of a cyclohexane mono-carboxylic acid when used in the mixture of resin and primary plasticizer is surprising in the light of conventional wisdom as to the theory pertaining to useful non-exuding plasticizers. The compatibility of plasticizers with PVC (and their non-exuding behaviour) is usually attributed to the presence of diester or triester groups in the plasticizers, or to the combined presence of an ester group and at least one aromatic ring.

We have also found that the use of cyclohexane polycarboxylic acid esters as plasticizers for polyvinyl chloride also results in improved processability of the polyvinyl chloride compositions. This improved processability is particularly useful in the transformation of the plasticized polyvinyl chloride composition. Transformations include, for example, pelletising, extrusion, injection molding and calendering. Calendering is used in applications such as the production of roofing, protective films including stationery. Extrusion is used in the production of films, pipes, guttering and wire and cable coatings. Injection molding is used in the production of shoes, toys and the like.

The present invention therefore further provides the use of from 20 to 100 parts preferably from 30 to 90, more preferably from 40 to 80, more preferably from 50 to 70 by weight of a plasticizer composition containing one or more cyclohexane polycarboxylic acid esters per 100 parts of polyvinyl chloride to improve the processability of a polyvinyl chloride formulation.

In a further embodiment the present invention provides a plasticized polyvinyl chloride composition for use in pelletizing, extrusion, injection molding or calendering containing from 20 to 100 parts preferably from 30 to 90, more preferably from 40 to 80, more preferably from 50 to 70 by weight of a plasticizer composition containing one or more cyclohexane polycarboxylic acid esters per 100 parts by weight of polyvinyl chloride.

In a further embodiment the invention provides extruded articles obtained from a plasticized polyvinyl chloride composition containing from 20 to 100, preferably from 30 to 90, more preferably from 40 to 80, more preferably from 50 to 70 parts by weight of a plasticizer composition containing one or more cyclohexane polycarboxylic acid esters per 100 parts of polyvinyl chloride.

In a further embodiment the invention provides pellets comprising polyvinyl chloride and from 10 to 100, preferably from 30 to 90, more preferably from 40 to 80, more preferably from 50 to 70 parts by weight of a plasticizer composition containing one or more cyclohexane polycarboxylic acid esters per 100 parts of polyvinyl chloride.

In a further embodiment the invention provides injection molded articles obtained from a plasticized polyvinyl chloride composition containing from 20 to 100, preferably from 30 to 90, more preferably from 40 to 80, more preferably from 50 to 70 parts by weight of cyclohexane polycarboxylic acid esters per 100 parts of polyvinyl chloride.

In a further embodiment the invention provides articles obtained by calendering a plasticized polyvinyl chloride composition containing from 20 to 100, preferably from 30 to 90, more preferably from 40 to 80, more preferably from 50 to 70 parts by weight of a plasticizer composition containing one or more cyclohexane polycarboxylic acid esters per 100 parts by weight of polyvinyl chloride.

We have also found that if esters of cyclohexane polycarboxylic acids are used as plasticizers in one of adjacent layers of plasticized polyvinyl chloride and phthalate plasticizers particularly di-2 ethyl hexyl phthalate are used as plasticizer in the other adjacent layer, the migration of the plasticizer from one layer to the other is reduced as compared with adjacent foils, which contain different of differing amounts of phthalate plasticizer. Undesirably high levels of migration can lead to unsightly crinkling of the multi layer foil.

Accordingly, in a further embodiment the present invention provides a multilayer article in which at least two adjacent layers comprise plasticized polyvinyl chloride wherein the plasticizer in one of said two adjacent layers contains an ester of a cyclohexanepolycarboxylic acid.

In a further embodiment, the invention provides the use of any one of the cyclohexanepolycarboxylic acid esters mentioned herein as a plasticizer for polyvinyl chloride to reduce the migration of plasticizer between adjacent layers of plasticized polyvinyl chloride at least one of which contains a phthalate ester, particularly di-2 ethyl hexyl phthalate as plasticizer.

We have also found that secondary alcohol cyclohexanediacid esters are useful in flexible PVC electrical insulation and jacketing. Higher temperature insulation rated for 90°-105° products may include plasticizer blends of the higher molecular weight C10-C12 secondary alcohol with trimellitate esters such as tri-2-ethylhexyl trimellitate, tri-isononytrimellitate, tri-sec octyl trimellitate, tri-sec-nonyl trimellitate, and tri-n-octyl trimellitate.

Trade names used herein are indicated by a ™ symbol or ® symbol, indicating that the names may be protected by certain trademark rights, e.g., they may be registered trademarks in various jurisdictions.

All patents and patent applications, test procedures (such as ASTM methods, UL methods, and the like), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention.

What is claimed is:

1. A composition comprising at least one C7-C12 secondary alcohol ester of a 1,2-cyclohexanedicarboxylic acid, said 1,2-cyclohexanedicarboxylic acid ester prepared by hydrogenation after esterification, polyvinyl chloride, and a plasticizer selected from the group consisting of di-isononyl cyclohexanedicarboxylic acid, di-2-propylheptyl cyclohexanedicarboxylic acid, di-2-ethylhexyl cyclohexanedicarboxylic acid, di-2-ethylhexyl terephthalate, dibutyl terephthalate, dibenzoate esters of dipropylene glycol or diethylene glycol, tri-2-ethylhexyl trimellitate, tri-isononyl trimellitate, tri-sec-octyl trimellitate, tri-sec-nonyl trimellitate, and mixtures thereof.

2. A plastisol composition comprising the composition of claim 1, further comprising at least one additive selected from the group consisting of stabilizers, fillers, colorants, and viscosity control agents, wherein said at least one C7-C12 secondary alcohol ester is present in the amount of 1 phr to 80 phr, and wherein a total plasticizer concentration ranges from 40 to 200 phr.

* * * * *